United States Patent
Porcheron

(10) Patent No.: US 7,922,184 B2
(45) Date of Patent: Apr. 12, 2011

(54) STEERING MECHANISM, PARTICULARLY FOR SHORT VEHICLES

(75) Inventor: Francois Porcheron, Brussels (BE)

(73) Assignee: 4Power4 SPRL, Brussels (BE)

( * ) Notice: Subject to any disclaimer, the term of this patent is extended or adjusted under 35 U.S.C. 154(b) by 0 days.

(21) Appl. No.: 12/622,843

(22) Filed: Nov. 20, 2009

(65) Prior Publication Data

US 2010/0065346 A1  Mar. 18, 2010

Related U.S. Application Data

(63) Continuation of application No. PCT/EP2007/055022, filed on May 23, 2007.

(51) Int. Cl.
  *A61G 5/04* (2006.01)
  *B62D 7/09* (2006.01)
  *B62D 7/14* (2006.01)
  *B62D 7/16* (2006.01)
  *B62D 7/20* (2006.01)
  *B60K 17/30* (2006.01)
  *B60R 16/04* (2006.01)

(52) U.S. Cl. .............. 280/93.506; 280/91.1; 280/99; 180/6.28; 180/6.5

(58) Field of Classification Search ............ 280/91.1, 280/93.502, 93.507, 93.508, 93.51, 93.511, 280/99; 180/402, 403, 408, 411, 432, 433, 180/440
See application file for complete search history.

(56) References Cited

U.S. PATENT DOCUMENTS

| | | | | |
|---|---|---|---|---|
| 718,663 A | * | 1/1903 | Shearer | 111/83 |
| 1,012,233 A | * | 12/1911 | Bartram | 280/93.504 |
| 1,472,940 A | * | 11/1923 | Ross | 280/93.506 |
| 2,584,672 A | * | 2/1952 | Clemons | 280/103 |
| 2,652,263 A | * | 9/1953 | Varnum | 280/124.139 |
| 3,051,257 A | * | 8/1962 | Selle | 180/440 |
| 3,463,507 A | * | 8/1969 | Butler | 280/103 |
| 3,479,050 A | * | 11/1969 | Bloise | 280/124.113 |

(Continued)

FOREIGN PATENT DOCUMENTS

DE  10338998 A1  3/2005

(Continued)

OTHER PUBLICATIONS

International Search Report for PCT/EP2007/055022 dated Dec. 6, 2007.

*Primary Examiner* — Lesley Morris
*Assistant Examiner* — Wesley Potter
(74) *Attorney, Agent, or Firm* — Pearne & Gordon LLP

(57) ABSTRACT

Steering mechanism for orienting the steered wheels (1*a-d*) of a short vehicle with respect to the chassis, comprising one first vertical axis (2) per steered wheel, allowing each steered wheel (1*a-d*) to pivot with respect to said chassis and a first link (5*a-d*) allowing a torque to be applied to each steered wheel to make it pivot around said first vertical axis.

The inner end of the link is able to slide along a straight rail (11*a-d*) which in turn is rotatably mounted with respect to the chassis 60.

A second link (6*a-d*) not parallel to the wheels forces the first link (5*a-d*) to slide in a defined manner along a rail (11*a-d*). This makes possible the differentiated orientation of the left and right wheels.

Advantage: very small turning radius. Particularly applicable to electric chairs for the disabled.

19 Claims, 8 Drawing Sheets

U.S. PATENT DOCUMENTS

| | | | | |
|---|---|---|---|---|
| 4,109,748 A | * | 8/1978 | Evans | 180/421 |
| 4,505,491 A | | 3/1985 | Sano et al. | |
| 4,805,712 A | * | 2/1989 | Singleton | 180/65.1 |
| 5,048,853 A | * | 9/1991 | Trefz et al. | 180/411 |
| 5,174,595 A | * | 12/1992 | Snipes | 180/411 |
| 5,288,091 A | | 2/1994 | Deschamps | |
| 5,482,125 A | * | 1/1996 | Pagett | 180/6.32 |
| 5,531,466 A | * | 7/1996 | Hayashi | 280/91.1 |
| 5,862,874 A | | 1/1999 | Brienza et al. | |
| 5,890,558 A | * | 4/1999 | Keegan | 180/211 |
| 5,924,506 A | * | 7/1999 | Perego | 180/65.51 |
| 6,059,056 A | * | 5/2000 | Becker | 180/24.01 |
| 6,675,927 B1 | * | 1/2004 | Enmeiji et al. | 180/411 |
| 6,722,675 B2 | * | 4/2004 | Bidwell | 280/89 |
| 7,278,511 B1 | * | 10/2007 | Gass et al. | 180/409 |
| 7,549,501 B2 | * | 6/2009 | Kesselgruber | 180/402 |
| 2005/0236217 A1 | * | 10/2005 | Koelin et al. | 180/411 |

FOREIGN PATENT DOCUMENTS

| | | |
|---|---|---|
| FR | 1125413 | 10/1956 |
| JP | 62199573 | 9/1987 |
| JP | 63097468 A | 4/1988 |

* cited by examiner

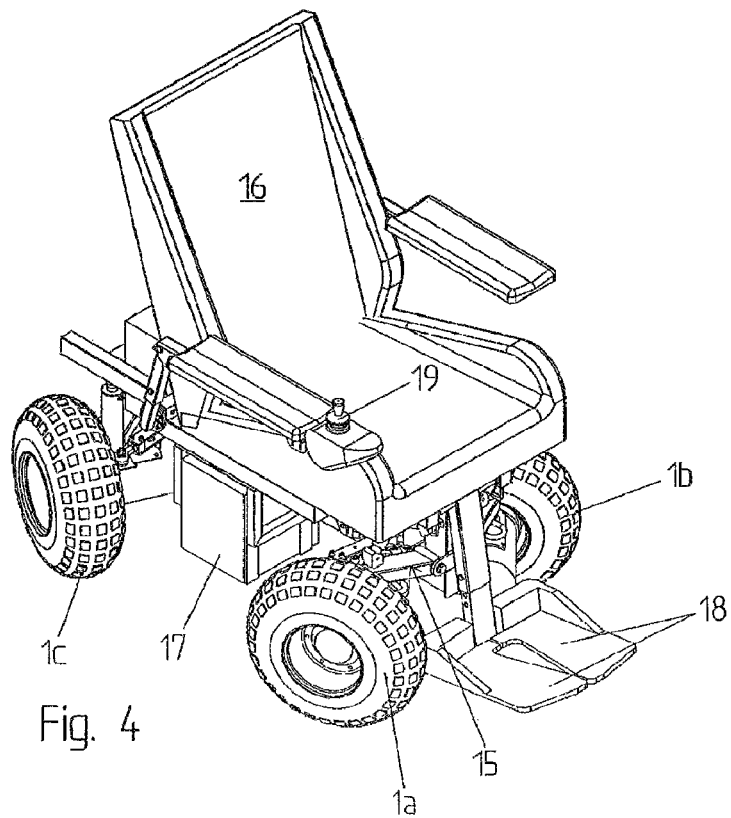
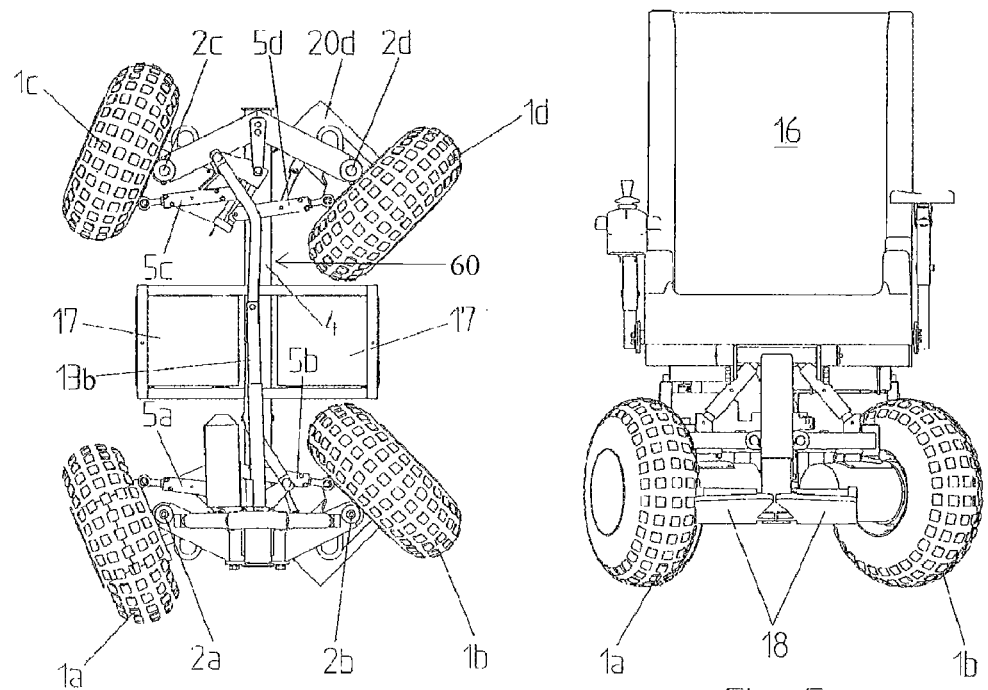

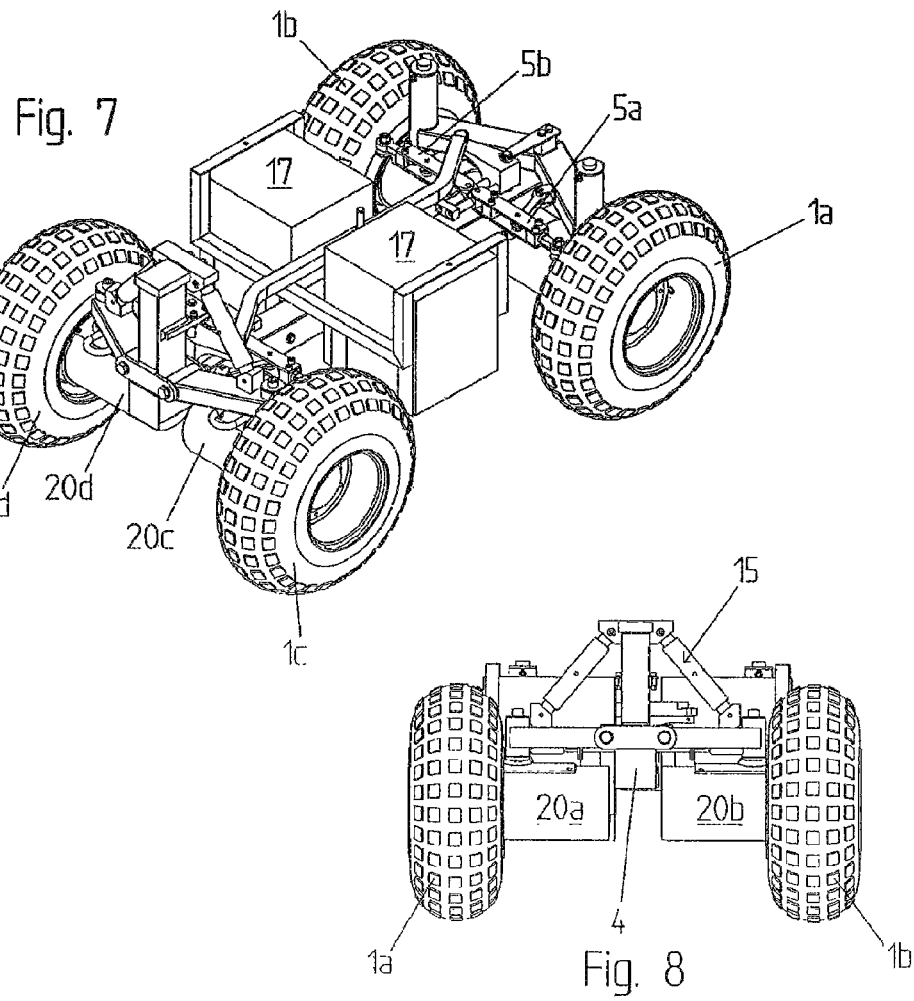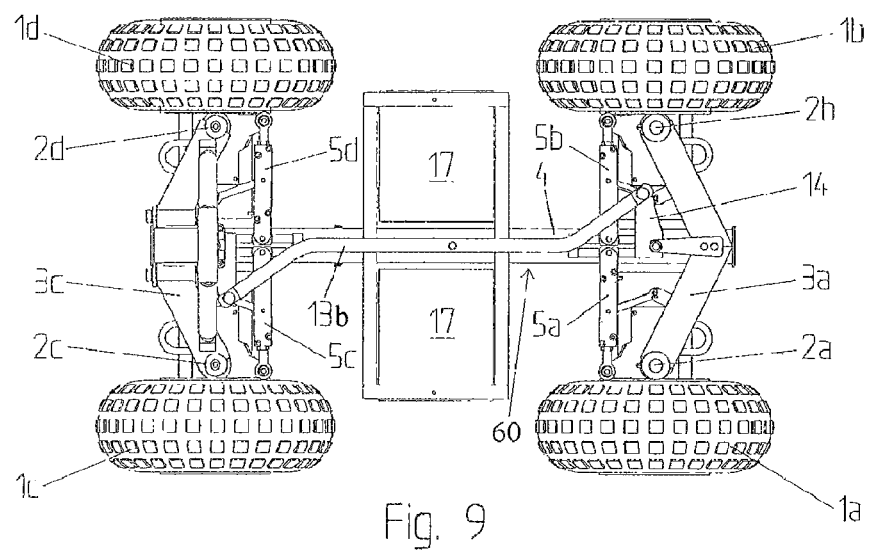

STEERING MECHANISM, PARTICULARLY FOR SHORT VEHICLES

The present invention is a continuation of international application PCT/EP2007/55022 filed on May 23, 2007, the content of which is enclosed by reference.

TECHNICAL FIELD

The present invention relates to a steering mechanism for directing the steered wheels of a vehicle with respect to the chassis. The present invention relates in particular to a steering mechanism intended for short vehicles and for which a reduced steering radius is required. The present invention also relates to a wheelchair for disabled people provided with such a steering mechanism.

STATE OF THE ART

The most often used steering mechanism in vehicles with four wheels is known under the name of Ackermann steering. The Ackermann steering, which it is not necessary to describe here in more detail, allows the four wheels of the vehicle to be oriented towards the tangents of concentric circles. The steering radius is determined by the distance between the center of the circles and the wheels. The wheels thus turn around a same point, which makes it possible to preserve the tires, to guarantee an optimum adhesion and to reduce the noise.

The geometry of the Ackermann device is however not perfect and the centers of rotation of the four wheels are not perfectly superimposed. In addition, the steering radius depends on the length of the vehicle and especially on the distance between the front axle and the rear axle. Though very long vehicles, for example coaches, can perform sharp turns, the same does not apply to short vehicles.

Yet many short vehicles, notably wheelchairs for the disabled or commercial vehicles such as small tractors, require a large maneuverability and a reduced steering radius in order to change the orientation of the vehicle practically on the spot, without excessive wear on the tires and with a minimum of noise.

U.S. Pat. No. 4,852,679 describes a steering with reduced steering radius for an electrical wheelchair. The mechanism uses cables to connect the four wheels to the center of the vehicle. The unit is fragile and the different cables require a substantial amount of space under the vehicle. This volume cannot be used for the batteries for example.

DE4236786 describes a steering for an electrical wheelchair that affords a very small steering radius thanks to a system of cams. The computing and machining of the cams are complex, and the wear and tear of the movable parts in the cams is rapid.

Another steering mechanism based on cams is described in U.S. Pat. No. 5,862,874.

Other wheelchairs are steered by accelerating the outside wheels in the turns, without orienting them correctly. These mechanisms are simple to make mechanically, but the electronics for the motor control are more complex. Furthermore, the badly oriented tires make a substantial noise in the turns and tend to wear rapidly by leaving marks.

An aim of the present invention is thus to propose an improved steering mechanism compared to the prior art mechanisms, and in particular a device adapted for short vehicles that does not have the above-mentioned disadvantages.

According to the invention, these aims are achieved by means of a steering mechanism according to the independent claim, preferred variant embodiments being indicated in the dependent claims.

In particular, these aims are achieved by means of a steering mechanism for directing the steered wheels of a vehicle with respect to the chassis, including:

a first vertical axis per steered wheel, allowing each steered wheel to pivot with respect to said chassis in order to modify the direction of the vehicle, a connecting rod allowing a torque to be applied to each steered wheel to make it pivot around said first vertical axis, a first linear displacement axis allowing for translation movements between the second end of said link and said chassis.

The first linear displacement axis makes it possible to move the link in order to modify the direction of the wheel in the turns.

In a preferred embodiment, the movable end of the links can pivot with respect to the chassis. The end of the links can thus move along two axes with respect to the chassis. The first axis allows a translation movement, for example along a rail, and the second axis allows the slide to pivot with respect to the chassis.

In a preferred embodiment, the two degrees of freedom are not independent from one another, or at least not totally independent. The position of the link along the corresponding slide, or the range of possible positions, depends then on the orientation of the slide. This configuration makes it possible to ensure that the steering centers of the four wheels are superimposed whatever the steering radius.

In a preferred embodiment, a second link that is not parallel to the wheels forces the first link to slide in a defined manner along a rail. This makes possible a differentiated orientation of the left and right wheels.

BRIEF DESCRIPTION OF THE DRAWINGS

Examples of embodiments of the invention are indicated in the description illustrated by the attached figures, wherein:

FIG. 4 illustrates a perspective view of the wheelchair of FIG. 1, with the wheels turned at about 45°.

FIG. 5 is a front view of the wheelchair of FIG. 4.

FIG. 6 is a top view of the wheelchair of FIG. 4.

FIG. 7 illustrates a perspective view of the wheelchair of FIG. 1, with the wheels straight, the seat and the footrest having been dismantled.

FIG. 8 is a front view of the wheelchair of FIG. 7.

FIG. 9 is a top view of the wheelchair of FIG. 7.

EXAMPLE(S) OF EMBODIMENTS OF THE INVENTION

Figure 1:
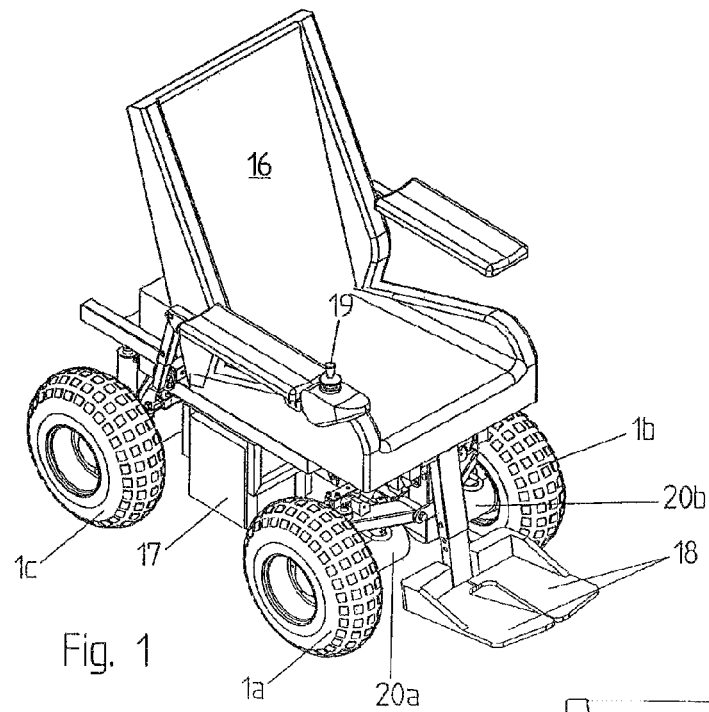
FIG. 1 illustrates a perspective view of a wheelchair provided with a steering according to the invention, with the wheels straight.
Figure 3:
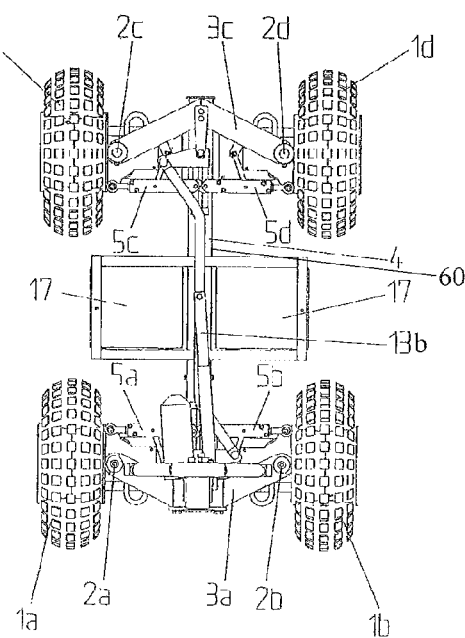
FIG. 3 is a top view of the wheelchair of FIG. 1.

The figures illustrate a wheelchair provided with a steering according to the claims. The mechanism described is however applicable to other types of vehicles, notably to any type of short vehicles requiring a reduced steering radius, including vehicles with two or four steered wheels and with two or four drive wheels.

The illustrated wheelchair comprises a seat 16 and footrests 18 mounted on a chassis and four wheels 1a, 1b, 1c and 1d. The inclination of the seat can preferably be modified with the aid of an electric motor, not represented. A joystick 19 enables the user to steer the chair using a single hand; auxiliary buttons, not represented, make it possible to control additional functions, for example to modify the inclination and/or height of the seat.

The four wheels are drive wheels and are driven each by an electric motor 20a, 20b, 20c, 20d. The motors are powered electrically by means of batteries 17 located advantageously under the seat 16, on both sides of the steering transmission rod 13. Control electronics, not represented, make it possible to control independently the speed of the four wheels 1 according to the instructions entered using the joystick 19. As can be seen in particular in FIG. 6 or 14, the electric motors are mounted on the rotation axis of the wheels and thus turn with the wheel in the turns. In a preferred embodiment, the electronic control of the motors makes it possible to assign to the outside wheels a speed greater than the speed of the inside wheels in the turns.

In one embodiment, the wheels are driven by means of a single central motor. It is of course also possible to drive only the front wheels or the rear wheels.

The wheels 1a to 1d can turn with respect to the wheelchair and to a chassis 60, constituted notably of transversal cross-pieces 3a-d and of the longitudinal cross-piece 4, around the first vertical axis 2a to 2d respectively, so as to change the direction of the vehicle. The movements of the four wheels are linked mechanically to one another, so that the rotation of one wheel necessarily causes the orientation of the other three wheels to be modified.

A first link 5a to 5d is associated with each wheel 1a to 1d respectively. A first end of the first links 5a-d is connected in an articulated fashion to a point 50a to 50d of the corresponding wheel distant from a rotation axis 20. By actuating a first link 5a-d to move the corresponding articulation 50, the orientation of the wheel 1a-d and the direction of the vehicle are changed.

Figure 16:
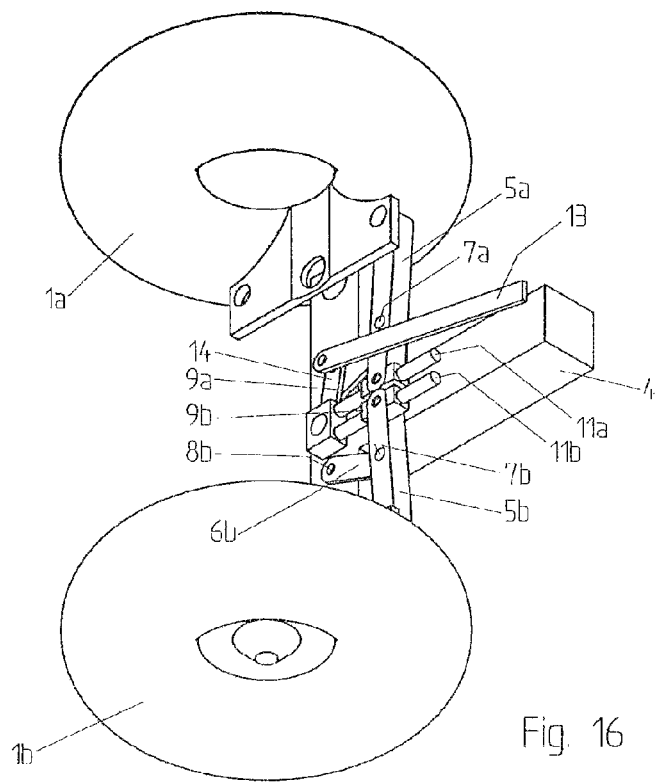
FIG. 16 is a perspective view of a part of the device of FIG. 15, corresponding to one of the two axles.

A second end of each first link 5a-d, towards the inside of the vehicle, is connected by a pivot 10a-d to a slide 9a-d. The second end of each first link 5a-d can thus move with the slide along a rectilinear rail 11a-d, along a first linear displacement axis. When the vehicle's wheels are straight, in the position illustrated for example in FIG. 13 or 16, both slides of a same axle find themselves in the same longitudinal position along the rail. They move in opposite direction in the turns, the maximum amplitude of the displacements being limitable in both directions.

Each rail 11a-d is further connected to the vehicle's chassis 60 by means of a vertical axis 12a/12c allowing the slides to pivot in a horizontal plane. In the example of embodiment illustrated, both front rails 11a, 11b are articulated by means of a common axis 12a in the vehicle's longitudinal axis; the same applies to the two rails 11c, 11d of the rear axle, connected to a common axis 12c.

Figure 14:
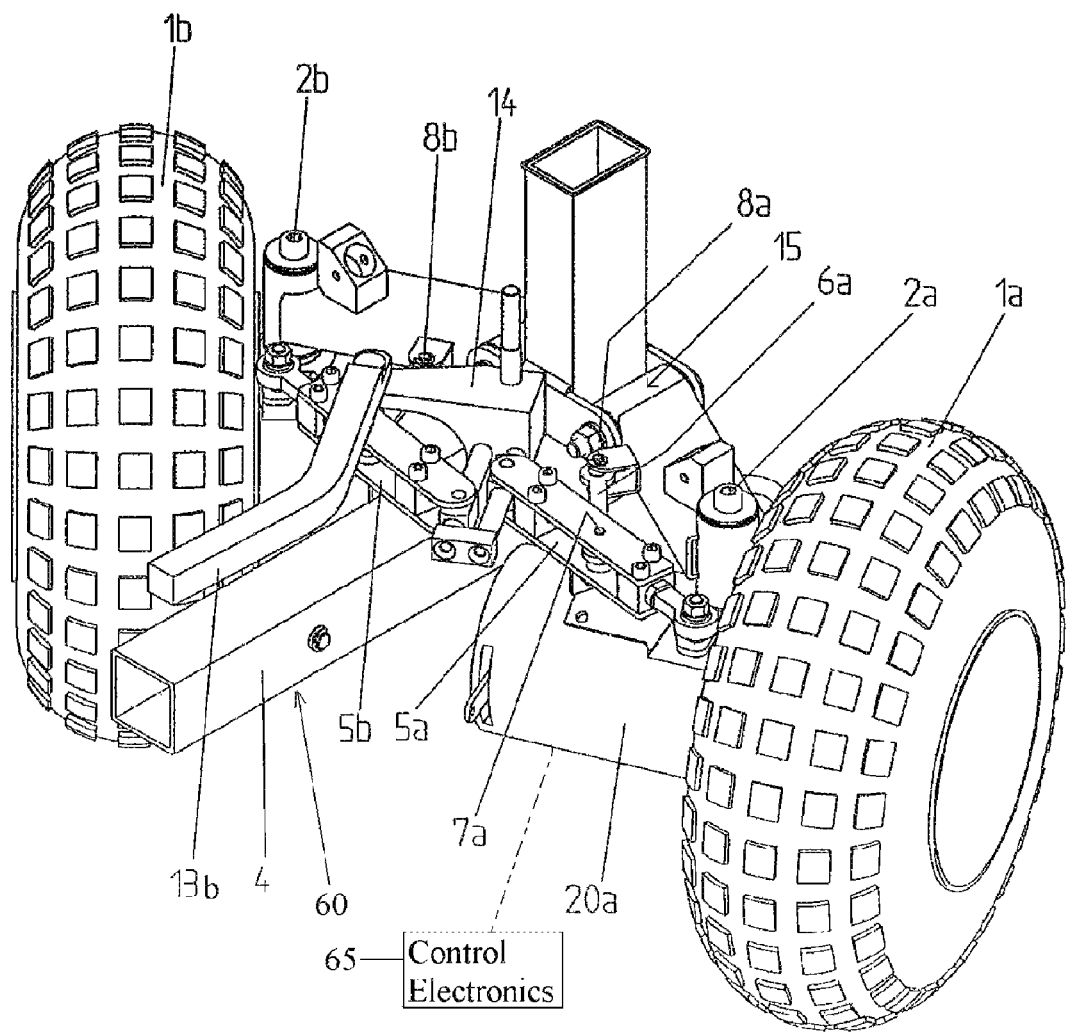
FIG. 14 is a perspective view of the front axle with the wheels turned at about 45°.
Figure 17:
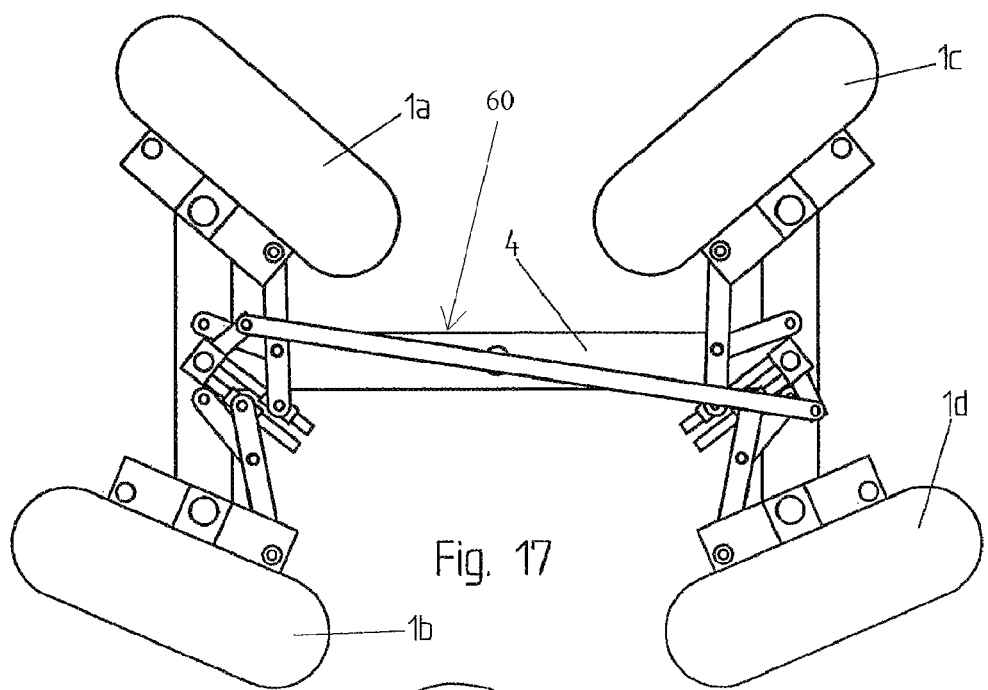
FIG. 17 is a top view of the chassis and of a simplified embodiment of the steering mechanism, without the suspensions, with the wheels being turned at about 45°.
Figure 18:
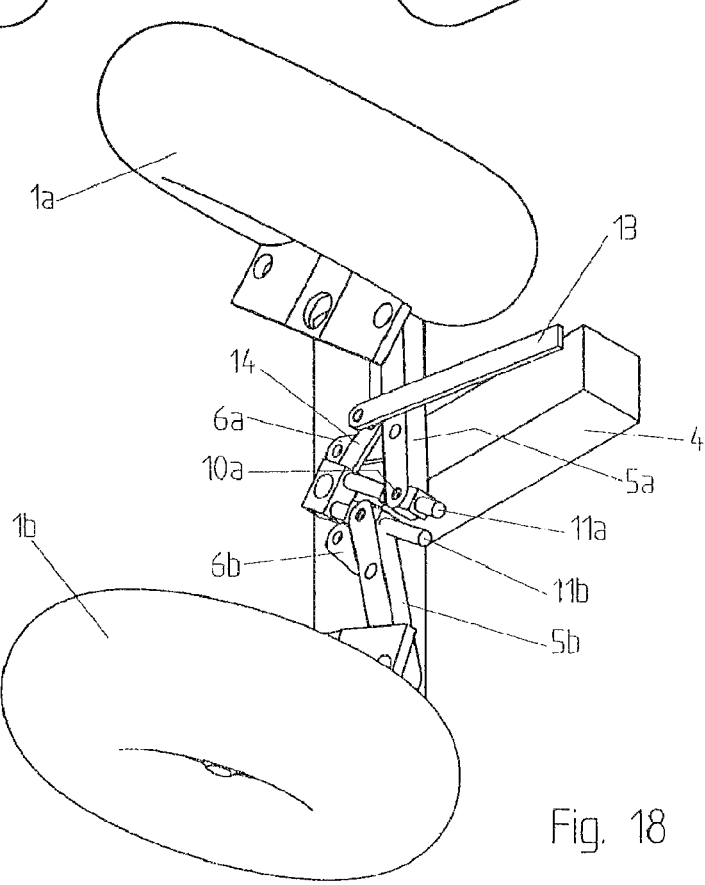
FIG. 18 is a perspective view of part of the device of FIG. 17, corresponding to one of the two axles.

This arrangement thus enables the ends of a front and rear axle's 60a, 60d links respectively to pivot around the axes 12a and 12c respectively. These rotation axes constitute a second degree of freedom for the displacements of the inner ends of the first links 5a-d. FIG. 14 or 17 for example make it possible to observe that the rails 11a-d of each axle turn in the same direction as the wheels of the corresponding axle, the rotation angle being however different.

The rotation of the rails 11a-d of each axle 61a, 61b around the common vertical axis 12a, 12c further enables the rotations of both wheels 1a-d of each axle 61a, 61b to be connected mechanically; the pivoting of one wheel 1a-d causes the corresponding slide 9a-d to rotate around the axis 12, then the other wheel 1a-d of the same axle 60a, 60b to pivot.

The elements of the steering mechanism associated to each wheel 1a-d further comprise a second link 6a to 6d. One end of each second link 6a-d is connected to the corresponding first link 5a-d by means of a vertical axis 7 enabling the first 5a-d and second 6a-d links to pivot one relative to the other. The other end of the second links 6a-d pivots with respect to the cross-pieces 3 of the chassis 60 around vertical axis 8.

The second links 6a-d make it possible to force the corresponding first link 5a-d to slide along the associated rail 11a-d during the rotations of the slides 9a-d around the axis 12a, 12c. The two mentioned degrees of freedom are thus not independent from one another; a rotation of the extremity of the second links 6a-d necessarily causes a translation along the corresponding rail 11a-d. The trajectory travelled by the inner end of the second links 6a-d when the wheels 1a-d are turning is thus the combination of a translation and of a rotation connected to one another by the geometry of the system. This arrangement makes it possible to have the four wheels 1a-d turn around a common steering center; it is observed in the figures (FIGS. 6 and 17) that the steering radii of the outside wheels 1a, 1c are greater than the radii of the inside wheels 1b, 1d in the turns.

The steering mechanism of the front wheels 1d, 1c and of the rear wheels 1a, 1b is connected through a transmission rod 13. The rod 13 is connected to the pivot 12a through a connecting element 14a and to the rear pivot 12b by an element 14c. The rotations of one of the pivots 12a, 12b in one direction are transmitted by the rod 13 to the other pivot 12a, 12b that turns in the opposite direction, so as to steer the wheels 1a-d of both axles 61a, 61b in opposite direction. In the variant embodiment of FIGS. 15 to 18, the bar rod 13 is rectilinear and slanted relative to the longitudinal cross-piece 4 and the symmetry axis of the chassis 60. The variant embodiment of FIGS. 1 to 14 on the other hand uses a rod 13 provided with a double bend and whose central part is parallel to the cross-piece 4 at least when the wheels are straight, as can be seen for example in FIG. 9. This arrangement makes it possible to reduce the width required at the center of the vehicle for the displacements of the rod 13b and thus to increase the space available for the batteries 17 on both sides of this rod 13b.

Figure 15:
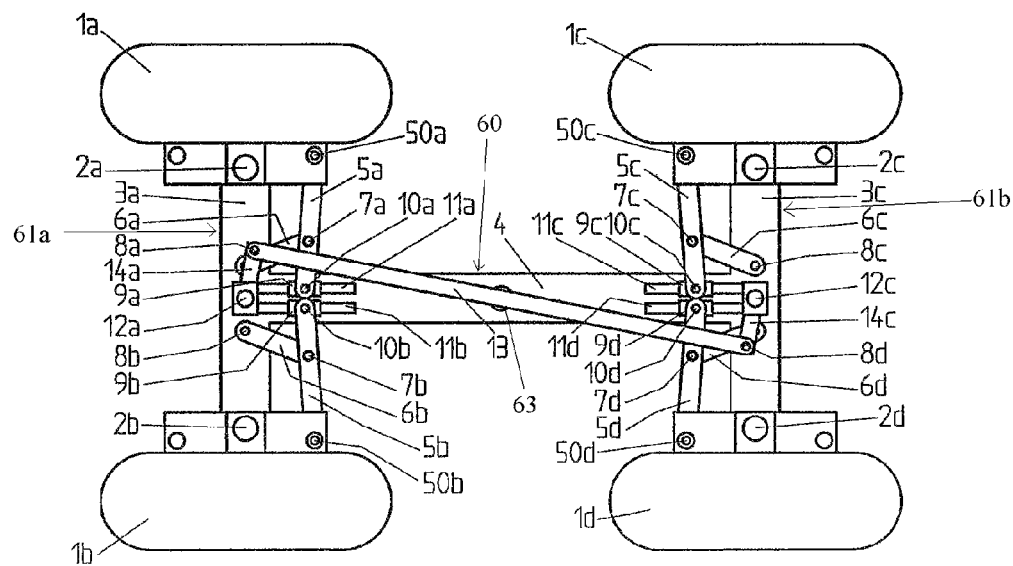
FIG. 15 is a top view of the chassis and of a simplified embodiment of the steering mechanism, without the suspensions, with the wheels being straight.

As indicated above, the rotations of the four wheels 1a-d are connected to one another. It is thus necessary to act on a single wheel 1a-d or a single element of the steering, for example by means of an electric actuator 63 (as shown in FIG. 15), to make the vehicle turn. In a preferred embodiment of the invention, the steering is controlled by an actuator, of which one fixed end is connected to the longitudinal cross piece 4 and the other mobile end to the transmission rod 13, 13b. The actuator's longitudinal position enables the momentary rotation angle of the wheels 1a-d to be determined. This position can be determined by the command given to the actuator 63 or by a sensor measuring the effective position achieved. This information can be used by the control electronics 65 (see FIG. 14) of the electric motors 20a-d to change the rotation speed of the inside 1d, 1d and outside wheels 1a, 1c in the turns.

In a variant embodiment, two distinct actuators are used to control the rotation of the front axle 61a and of the rear axle 61b. This embodiment enables the mechanical connection 4 between both axles 61a, 61b to be eliminated. Using an additional actuator does however make the control more complicated.

The transmission rod 13, 13b has the advantage of connecting mechanically the rotations of the front wheels 1d, 1c with those of the rear wheels 1a, 1b. It is however also possible to actuate the front steering independently of the rear steering, for example in order to actuate the rear steering only in sharp turns and/or when the speed is reduced. It is also possible within the frame of the invention to apply the steering mechanism to vehicles comprising only two steered wheels.

Figure 2:
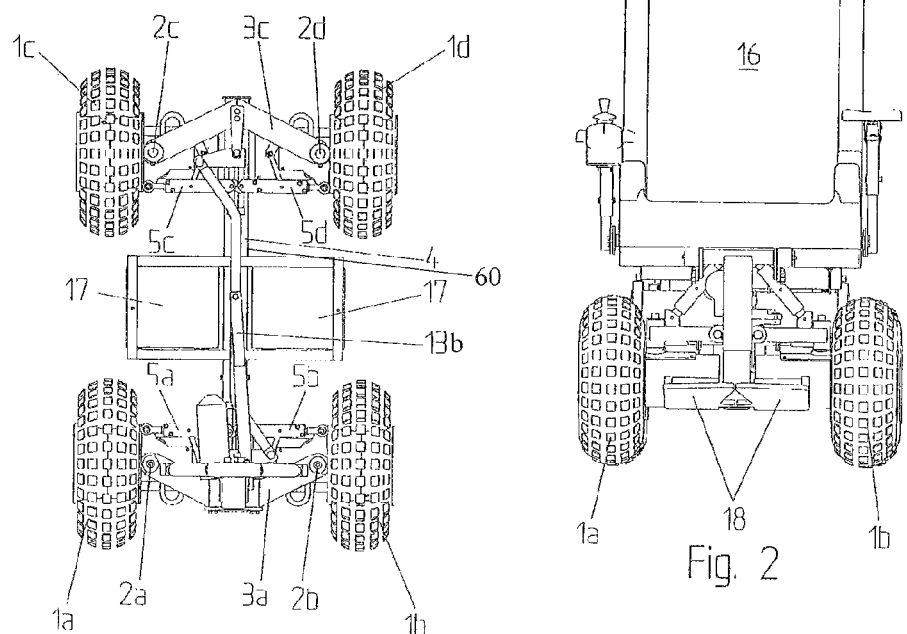
FIG. 2 is a front view of the wheelchair of FIG. 1.
Figure 10:
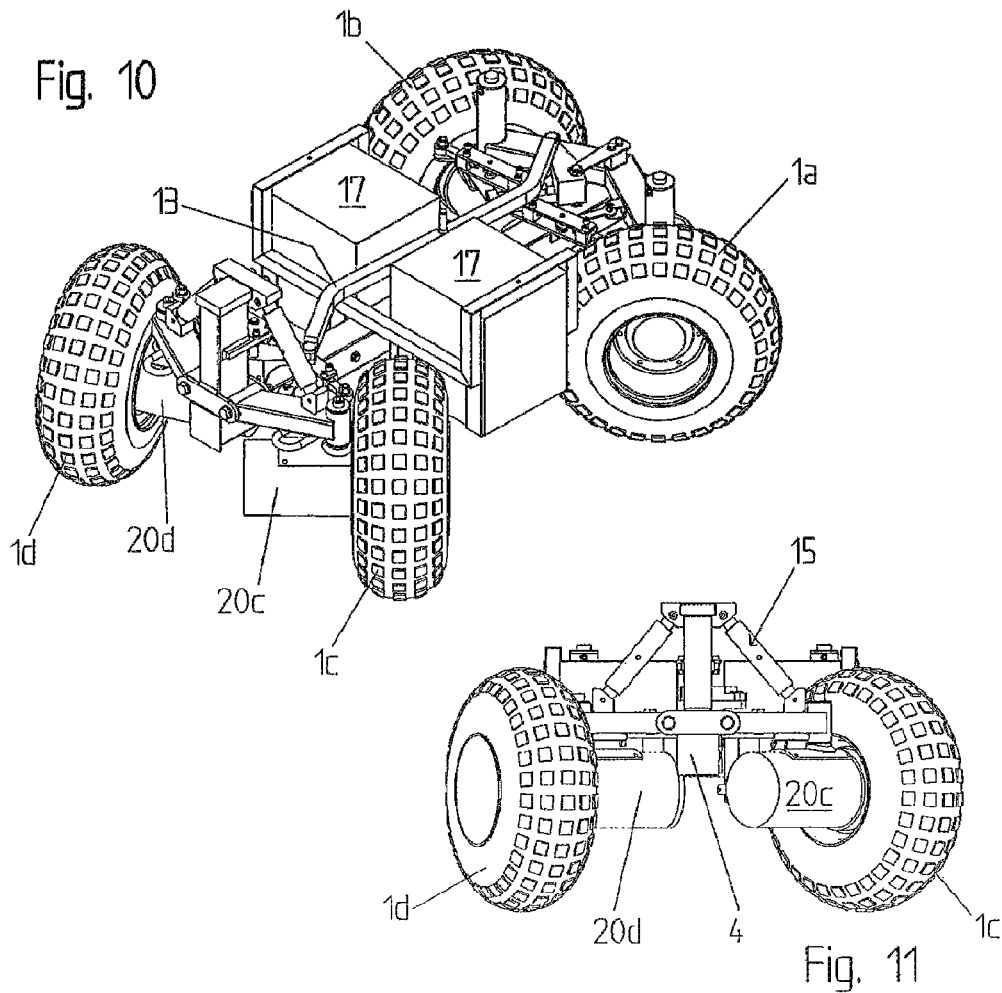
FIG. 10 illustrates a perspective view of the wheelchair FIG. 7, with the wheels turned at about 45°, the seat and the footrest having been dismantled.
Figure 11:
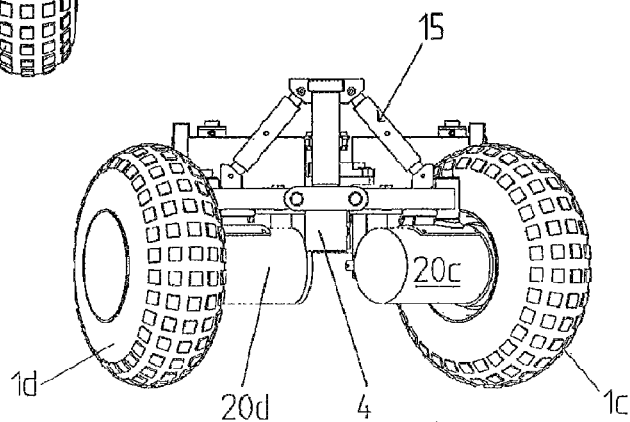
FIG. 11 is a front view of the wheelchair of FIG. 10.
Figure 12:
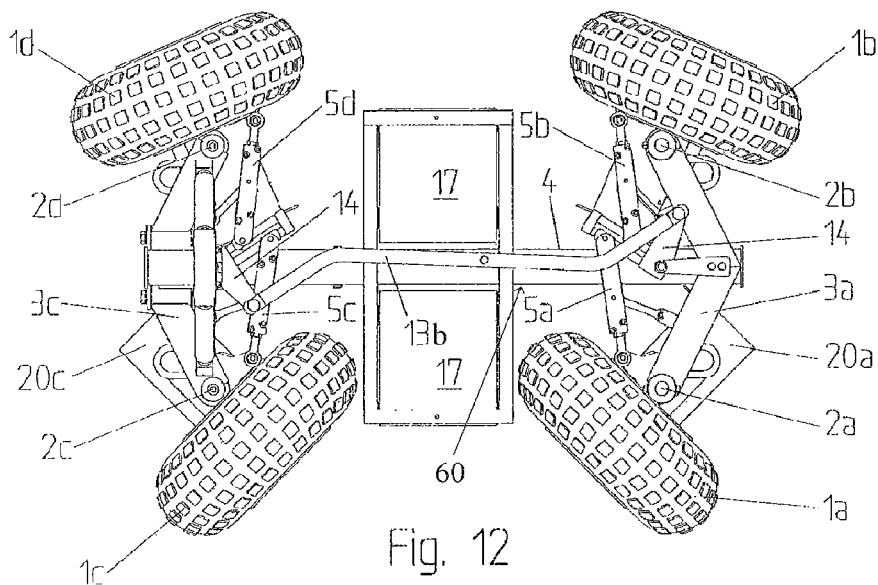
FIG. 12 is a top view of the wheelchair of FIG. 10.
Figure 13:
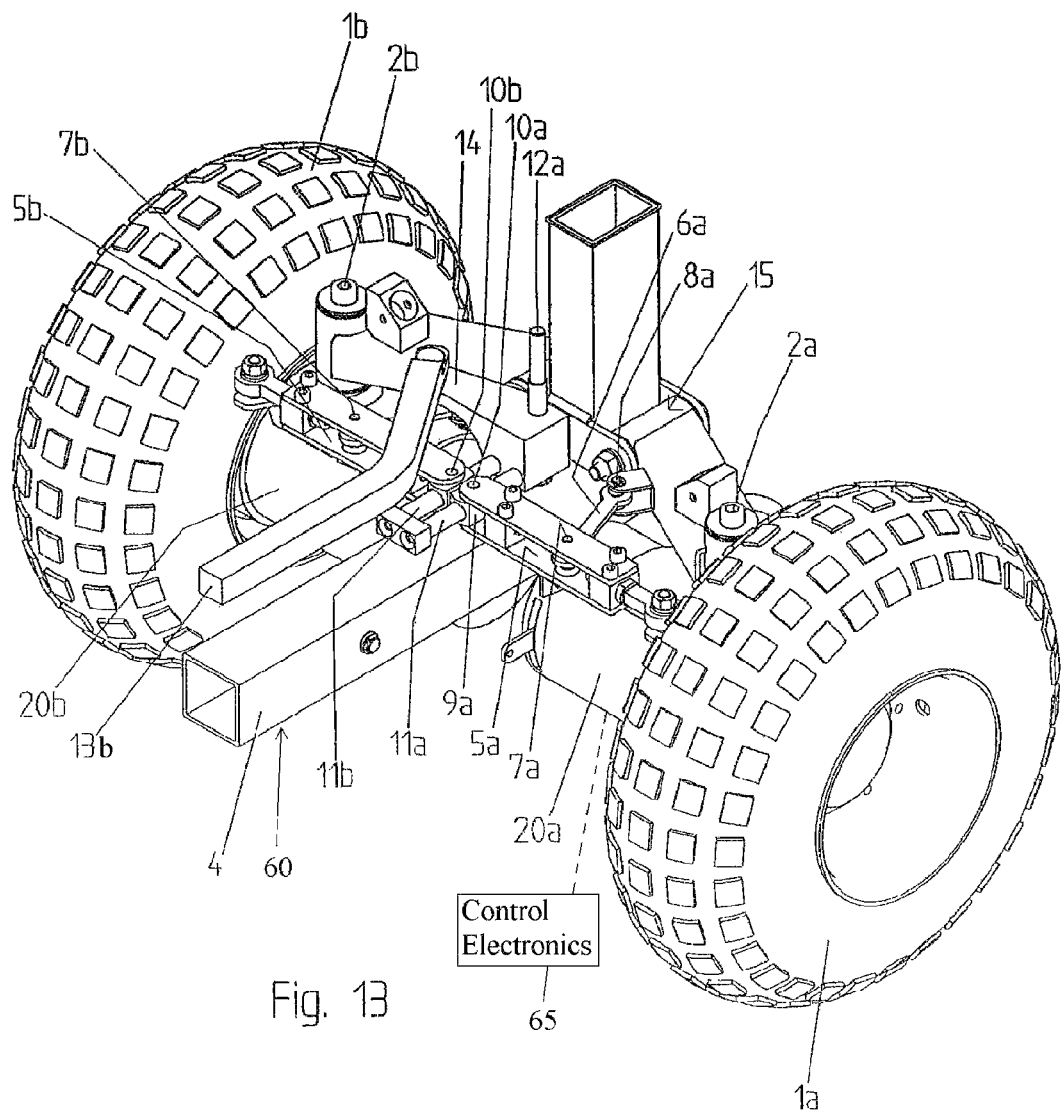
FIG. 13 is a perspective view of the front axle with the wheels straight.

As can be observed for example in FIG. 2, 13 or 14, the main components of the steering mechanism, notably the first links 5a-d and second links 6a-d as well as the rails 11a-d, are mounted horizontally roughly in the same plane as the lower base of the suspension 15. The steering thus remains fixed with respect to the wheels 1a-1d when the suspension 15 is actuated and does not collide with the upper part of the suspension or other elements of the wheelchair. The rails 11a-d are preferably constituted by cylinders of circular rather than polygonal section and thus enable the slides 9a-d and the first links 5a-d to pivot around the longitudinal axle of the rails 11a-d during any movements of the suspension. For this purpose, the distance between the two rails 11a-d of a same axle is sufficient to avoid any collision between first links or between slides, even in the event of considerable movements of the suspension.

LIST OF THE REFERENCE NUMBERS USED

0 Center of rotation of the vehicle
1 Wheels
2 First vertical axis of the wheels
3 Transversal cross-piece
4 Longitudinal cross-piece
5 Links
50 Link-to-wheel connection
6 Second link
7 Third vertical axis
8 Fourth vertical axis
9 Slides
10 Links-to-slides spindles
11 Rails
12 Second slides to cross-pieces axis
13 Front-to-rear transmission rod
14 Spindle-to-transmission rod connection
15 Suspension mechanism
16 Seat
17 Batteries
18 Footrest
19 Joystick
20 Electric motors

The invention claimed is:

1. Steering mechanism for directing a plurality of steered wheels of a vehicle with respect to a chassis, wherein each steered wheel is adapted to pivot with respect to said chassis, the steering mechanism comprising, for each steered wheel:
a first vertical axis about which the steered wheel pivots;
a first link comprising a first end and a second end, wherein the first end is in co-operation with the steered wheel providing for a torque to be applied to the steered wheel to make the steered wheel pivot around said first vertical axis;
a first linear displacement axis defined by a rail, wherein the rail is pivotally connected to a cross-piece of said chassis to pivot about a second vertical axis, wherein said second end of said first link is mounted in a sliding fashion along the rail so that the second end of the first link can move relative to the rail, thereby allowing translational movement of the second end of said first link relative to said chassis.

2. The steering mechanism of claim 1, wherein rails are parallel to the longitudinal direction of the vehicle when the plurality of steered wheels are straight.

3. The steering mechanism of claim 1, wherein the plurality of steered wheels include two steered wheels of a common axle and wherein both rails corresponding to the two steered wheels pivot about the same second vertical axis.

4. The steering mechanism of claim 1, further comprising a respective second link for at least one of the steered wheels for forcing the second end of the respective first link to move along the respective first linear displacement axis when the respective rail is pivoted, so as to reduce the amplitude of the pivoting of the at least one steered wheel when said wheel is an outside wheel in a turn.

5. The steering mechanism of claim 1, further comprising a second link for each steered wheel for forcing the second end of the respective first link to occupy a predefined position along the respective first linear displacement axis, said position being variable during turns.

6. The steering mechanism of claim 1, wherein for each steered wheel there is also provided:
a second link,
a third vertical axis, about which said second link can pivot with respect to said first link, and
a fourth vertical axis arranged, about which said second link can pivot with respect to the chassis.

7. The steering mechanism of claim 1, wherein said rails pivot in turns in the same direction as said steered wheels, the rotation angle of the rails being different from the rotation angle of the associated wheels.

8. The steering mechanism of claim 1, wherein the plurality of steered wheels comprise four steered wheels, each steered wheel being in co-operation with the respective first link and wherein said second end of said first link is mounted in a sliding fashion along the respective rail connected to said chassis.

9. The steering mechanism of claim 8, wherein the four steered wheels include two front wheels and two rear wheels, and wherein the steering mechanism further comprises a transmission rod arranged to transmit rotation between the front wheels and the rear wheels.

10. The steering mechanism of claim 9, wherein said transmission rod comprises a longitudinal bar of which one end is adapted to be attached to the rails of the two front wheels whilst the other end is adapted to be attached to the rails of the two rear wheels.

11. The steering mechanism of claim 9, said transmission rod being provided with a double bend, a central part of said transmission rod being arranged so as to move longitudinally when the orientation of the wheels changes.

12. The steering mechanism of claim 1, further comprising a suspension in operative association with each steered wheel, each of said suspensions comprising a lower part in contact with the respective steered wheel, wherein each respective first link is connected to the lower part of each of said suspensions in contact with the steered wheels.

13. The steering mechanism of claim 12, wherein the rail consists of a cylindrical shaft allowing said first link to rotate around the longitudinal axis of said shaft during movements of said suspension.

14. The steering mechanism of claim 1, including a linear actuator to pivot the steered wheels with respect to said chassis.

15. The steering mechanism of claim 14, the linear actuator comprising one extremity of the actuator which is associated with said chassis and another extremity which is associated with a longitudinal rod associated with at least one of the rails.

16. The steering mechanism of claim 1, including an electric motor for each steered wheel, wherein each of said motors is configured to pivot with the associated steered wheel during the turns.

17. The steering mechanism of claim 16, further comprising electronic means for controlling the rotation speed of the electric motors so as to make outside wheels of the steered wheels turn faster than inside wheels of the steered wheels during turns.

18. A wheelchair, notably for the disabled, comprising a steering mechanism according to claim 1.

19. The wheelchair of claim 18, further comprising a seat and electric batteries for electrically driving the steered wheels, said batteries being placed under the seat, on both sides of a transmission rod between a front pair of the steered wheels and a rear pair of the steered wheels.

* * * * *